(12) United States Patent
Radmilac et al.

(10) Patent No.: US 8,843,927 B2
(45) Date of Patent: Sep. 23, 2014

(54) MONITORING AND UPDATING TASKS ARRIVAL AND COMPLETION STATISTICS WITHOUT DATA LOCKING SYNCHRONIZATION

(75) Inventors: Marko Radmilac, Bellevue, WA (US); Paul Ringseth, Bellevue, WA (US); Genevieve Fernandes, Redmond, WA (US); William R. Messmer, Woodinville, WA (US); Niklas Gustafsson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1016 days.

(21) Appl. No.: 12/428,918

(22) Filed: Apr. 23, 2009

(65) Prior Publication Data
US 2010/0275207 A1  Oct. 28, 2010

(51) Int. Cl.
- *G06F 9/46* (2006.01)
- *G06F 9/50* (2006.01)
- *G06F 9/455* (2006.01)
- *G06F 11/34* (2006.01)

(52) U.S. Cl.
CPC ...... *G06F 11/3466* (2013.01); *G06F 2201/865* (2013.01); *G06F 11/3452* (2013.01); *G06F 2201/88* (2013.01)
USPC ................ 718/100; 718/1; 709/223; 709/224

(58) Field of Classification Search
None
See application file for complete search history.

(56) References Cited

U.S. PATENT DOCUMENTS

| | | | |
|---|---|---|---|
| 5,867,643 A * | 2/1999 | Sutton | 710/15 |
| 5,893,005 A * | 4/1999 | Ogura | 399/11 |
| 6,256,775 B1 * | 7/2001 | Flynn | 717/127 |
| 6,269,376 B1 * | 7/2001 | Dhillon et al. | 707/613 |
| 6,367,992 B1 * | 4/2002 | Aruga et al. | 400/76 |
| 7,284,238 B2 | 10/2007 | Inagaki et al. | |
| 7,418,585 B2 | 8/2008 | Kissell | |
| 7,448,037 B2 | 11/2008 | Arimilli et al. | |
| 7,451,450 B2 | 11/2008 | Sankaranarayan et al. | |
| 7,474,991 B2 | 1/2009 | DeWitt, Jr. et al. | |
| 2004/0268314 A1 | 12/2004 | Kollman et al. | |
| 2006/0089951 A1 * | 4/2006 | Factor et al. | 707/200 |
| 2006/0130063 A1 * | 6/2006 | Kilian et al. | 718/100 |
| 2006/0195579 A1 * | 8/2006 | Inoue | 709/226 |

(Continued)

OTHER PUBLICATIONS
Friedman et al., "Windows 2000 Performance Guide" (copyright 2002).*

(Continued)

*Primary Examiner* — Emerson Puente
*Assistant Examiner* — Benjamin Wu
(74) *Attorney, Agent, or Firm* — Kevin Sullivan; Raghu Chinagudabha; Micky Minhas

(57) ABSTRACT

Each processing resource in a scheduler of a process executing on a computer system maintains counts of the number of tasks that arrive at the processing resource and the number of tasks that complete on the processing resource. The counts are maintained in storage that is only writeable by the corresponding processing resource. The scheduler collects and sums the counts from each processing resource and provides statistics based on the summed counts and previous summed counts to a resource manager in response to a request from the resource manager. The scheduler does not reset the counts when the counts are collected and stores copies of the summed counts for use with the next request from the resource manager. The counts may be maintained without synchronization and with thread safety to minimize the impact of gathering statistics on the application.

18 Claims, 5 Drawing Sheets

(56) References Cited

U.S. PATENT DOCUMENTS

| | | | |
|---|---|---|---|
| 2006/0221086 A1 | 10/2006 | Diard | |
| 2007/0083564 A1* | 4/2007 | Ramacher et al. | 707/200 |
| 2007/0136721 A1* | 6/2007 | Dunshea et al. | 717/174 |
| 2007/0234365 A1 | 10/2007 | Savit | |
| 2007/0288941 A1* | 12/2007 | Dunshea et al. | 719/328 |
| 2007/0300227 A1* | 12/2007 | Mall et al. | 718/102 |
| 2008/0005357 A1* | 1/2008 | Malkhi et al. | 709/248 |
| 2008/0005547 A1* | 1/2008 | Papakipos et al. | 712/244 |
| 2008/0005615 A1* | 1/2008 | Brenden et al. | 714/13 |
| 2008/0098207 A1 | 4/2008 | Reid et al. | |
| 2008/0148300 A1* | 6/2008 | Archer et al. | 719/330 |
| 2008/0155536 A1* | 6/2008 | Levit-Gurevich et al. | 718/1 |
| 2008/0163366 A1 | 7/2008 | Chinya et al. | |
| 2008/0172673 A1 | 7/2008 | Naik | |
| 2009/0049451 A1* | 2/2009 | Bates | 718/108 |
| 2009/0217276 A1* | 8/2009 | Brenner et al. | 718/102 |
| 2009/0307697 A1* | 12/2009 | Hurley et al. | 718/102 |
| 2010/0325636 A1* | 12/2010 | Ringseth et al. | 718/104 |
| 2010/0325637 A1* | 12/2010 | Radmilac et al. | 718/104 |

OTHER PUBLICATIONS

D. Chhajed and TJ. Lowe (eds.) Building Intuition: Insights From Basic. Operations Management Models and Principles, Chapter 5: Little's Law (2008).*

Lazowska et al., Quantitative System Performance: Computer System Analysis Using Queueing Network Models, Chapter 3: Fundamental Laws (1984).*

"Monitoring and Improving Application Performance", Retrieved at<<http://www.cs.uvm.edu/oracle9doc/server.901/a87504/ch2.htm>>, Release 1 (9.0.1), Part No. A87504-02, pp. 13.

Waddington, et al."Dynamic Analysis and Profiling of Multi-threaded Systems ", Retrieved at<<http://www.cs.wustl.edu/~schmidt/PDF/DSIS_Chapter_Waddington.pdf>>, pp. 32.

"Lauterbach TRACE32 Debugger Shows ThreadX V5 Performance and Trace Data to Speed Development ", Retrieved at<<http://www.embedded-computing.com/news/db/?5435>>, pp. 3.

"Trace ", Retrieved at<<http://www.cisco.com/en/US/products/sw/custcosw/ps1846/products_administration_guide_chapter09186a00800dd87d.html>>, pp. 7.

"Intel Trace Analyzer and Collector 7.2 ", Retrieved at<<http://cache-www.intel.com/cd/00/00/40/73/407324_407324.pdf>>, pp. 2.

Klues, et al., "Dynamic Resource Management in a Static Network Operating System", Retrieved at <<http://cse.seas.wustl.edu/Research/FileDownload.asp?599>>, Department of Computer Science & Engineering—Washington University in St. Louis, Oct. 9, 2006, pp. 15.

Barreto, et al., "Programming OS Schedulers with Domain-Specific Languages and Aspects: New Approaches for OS Kernel Engineering", Retrieved at <<http://www.emn.fr/x-info/bossa/acp4is-scheduling.pdf>>, International Workshop on Aspects, Components, and Patterns for Infrastructure Software at AOSD, 2002, pp. 6.

HP-UX Processor Sets, Retrieved at <<http://docs.hp.com/en/5185-4322/5185-4322.pdf>>, A Technical White Paper, Nov. 2001, pp. 1-26.

Schatz, et al., "Model-Based Software and Systems Development", Retrieved at <<http://www4.informatik.tu-muenchen.de/~schaetz/papers/ModelBased.pdf>>, White Paper, 2008, pp. 3.

Cai, et al., "The Gridkit Distributed Resource Management Framework", Retrieved at <<http://www.comp.lancs.ac.uk/~geoff/Publications/EGRID05.pdf>>, Lecture notes in computer science, vol. 3470, 2005, pp. 11.

Steere, et al., "A Feedback-driven Proportion Allocator for Real-Rate Scheduling", Retrieved at <<http://www.usenix.org/events/osdi99/full_papers/steere/steere.pdf>>, Proceedings of the 3rd Symposium on Operating Systems Design and Implementation, Feb. 1999, pp. 15.

"CPU Scheduling", Retrieved at <<http://www.cs.uic.edu/~i385/CourseNotes/5_CPU_Scheduling.html>>, Apr. 2, 2009, pp. 1-19.

Soundararajan, et al., "Dynamic Resource Allocation for Database Servers Running on Virtual Storage", Retrieved at <<http://www.usenix.org/events/fast/tech/full_papers/soundararajan/soundararajan_html/index.html>>, Apr. 2, 2009, pp. 19.

"Dynamic Feedback Load Balancing Scheduling", Retrieved at <<http://kb.linuxvirtualserver.org/wiki/Dynamic_Feedback_Load_Balancing_Scheduling>>, Apr. 2, 2009, pp. 5.

He, et al., "Feedback Control-based Dynamic Resource Management in Distributed Real-Time Systems", Retrieved at <<http://www-users.cs.umn.edu/~tianhe/Papers/DFCS-JSS.pdf>>, Jul. 7, 2006, pp. 1-20.

Lin, et al., "Double-loop Feedback-based Scheduling Approach for Distributed Real-Time Systems", Retrieved at <<https://eprints.kfupm.edu.sa/35839/1/35839.pdf>>, In HiPC 2003, pp. 10.

* cited by examiner

MONITORING AND UPDATING TASKS ARRIVAL AND COMPLETION STATISTICS WITHOUT DATA LOCKING SYNCHRONIZATION

BACKGROUND

Applications in a computer system typically do not have access to low level statistical data from the operating system about the application. The statistic data may identify a number of instructions retired by the application or the resource utilization by the application, for example. To obtain statistical data, application developers often resort to intrusive methods of gathering statistical data such as profiling the execution of the application or making rough approximations about the execution of the application. Unfortunately, the use of intrusive methods of gathering statistical data generally affects the outcome of the experiment (i.e., the observation changes the performance of the application) and the use of approximations may provide crude or unusable data.

In applications that implement concurrent programming (viz., interaction between multiple execution contexts such as threads, fibers (i.e., lightweight threads), and child processes), shared data is typically synchronized. When an execution context accesses data, it generally invokes a lock or other synchronization technique to ensure that no other execution context performs a conflicting access to the data. The synchronization prevents data from being corrupted but adds processing overhead to each data access. Perhaps more importantly, the synchronization often serializes the access to the data by different execution contexts. This serialization may inhibit the performance and scalability of a process, particularly where there are many independent processing resources that execute execution contexts.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Each processing resource in a scheduler of a process executing on a computer system maintains counts of the number of tasks that arrive at the processing resource and the number of tasks that complete on the processing resource. The counts are maintained in storage that is only writeable by the corresponding processing resource. The scheduler collects and sums the counts from each processing resource and provides statistics based on the summed counts and previous summed counts to a resource manager in response to a request from the resource manager. The scheduler does not reset the counts when the counts are collected and stores copies of the summed counts for use with the next request from the resource manager. The counts may be maintained without synchronization and with thread safety to minimize the impact of gathering statistics on the application.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
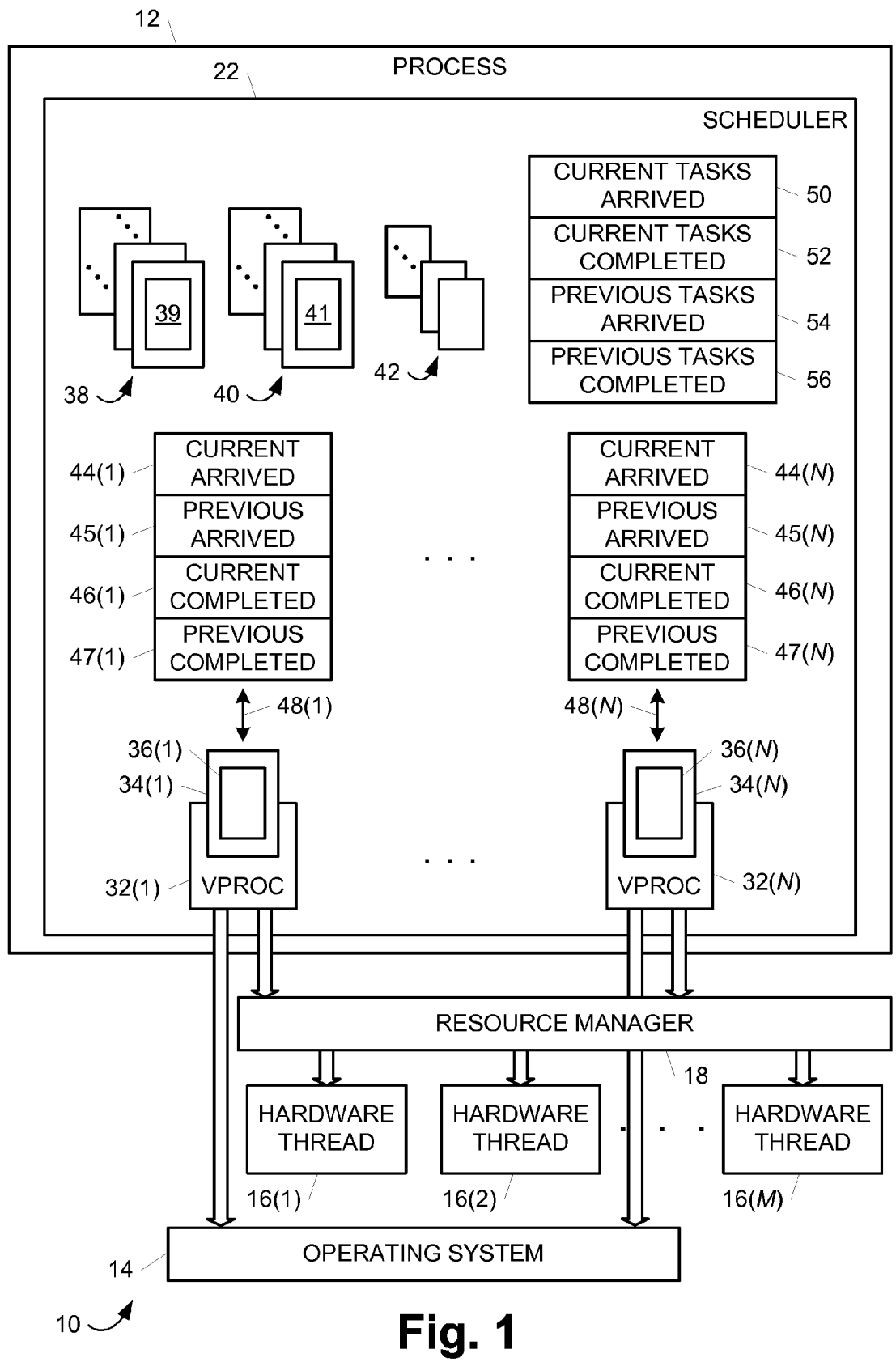
FIG. 1 is a block diagram illustrating an embodiment of a scheduler in a process in a runtime environment.

FIG. 1 is a block diagram illustrating an embodiment of a scheduler 22 in a process 12 in a runtime environment 10. Scheduler 22 is configured to schedule tasks for execution by processing resources using execution contexts.

Runtime environment 10 represents a runtime mode of operation in a computer system, such as a computer system 100 shown in FIG. 6 and described in additional detail below, where the computer system is executing instructions. The computer system generates runtime environment 10 from a runtime platform such as a runtime platform 122 shown in FIG. 6 and described in additional detail below.

Runtime environment 10 includes an least one invoked process 12, an operating system (OS) 14, a set of hardware threads 16(1)-16(M), where M is an integer that is greater than or equal to one and denotes the Mth hardware thread 16(M), and a resource manager 18. Runtime environment 10 allows tasks from process 12 to be executed, along with tasks from any other processes that co-exist with process 12 (not shown), using OS 14, resource manager 18, and hardware threads 16(1)-16(M). Runtime environment 10 operates in conjunction with OS 14 and/or resource manager 18 to allow process 12 to obtain processor and other resources of the computer system (e.g., hardware threads 16(1)-16(M)).

Runtime environment 10 includes a scheduler function that generates scheduler 22. In one embodiment, the scheduler function is implemented as a scheduler application programming interface (API). In other embodiments, the scheduler function may be implemented using other suitable programming constructs. When invoked, the scheduler function creates scheduler 22 in process 12 where scheduler 22 operates to schedule tasks of process 12 for execution by one or more hardware threads 16(1)-16(M). Runtime environment 10 may exploit fine grained concurrency that application or library developers express in their programs (e.g., process 12) using accompanying tools that are aware of the facilities that the scheduler function provides.

Process 12 includes an allocation of processing and other resources that host one or more execution contexts (viz., threads, fibers (i.e., lightweight threads), or child processes). Process 12 obtains access to the processing and other resources in the computer system (e.g., hardware threads 16(1)-16(M) and memory 104) from OS 14 and/or resource manager 18. Process 12 causes tasks to be executed using the processing and other resources. In the embodiment of FIG. 1, the processing resources include virtual processors 32(1)-32 (N), where N is an integer greater than or equal to two and denotes the Nth virtual processor 32.

Process 12 generates work in tasks of variable length where each task is associated with an execution context in scheduler 22. More than one task may be associated with a given execution context. Each task includes a sequence of instructions that perform a unit of work when executed by the computer system. Each execution context forms a thread, fiber (i.e., a lightweight thread), or analogous OS concept such as child process that executes associated tasks on allocated processing resources. Each execution context includes program state and machine state information. Execution contexts may terminate when there are no more tasks left to execute. For each task, runtime environment 10 and/or process 12 either assign the task to scheduler 22 to be scheduled for execution or otherwise cause the task to be executed without using scheduler 22.

Process 12 may be configured to operate in a computer system based on any suitable execution model, such as a stack model or an interpreter model, and may represent any suitable type of code, such as an application, a library function, or an operating system service. Process 12 has a program state and machine state associated with a set of allocated resources that include a defined memory address space. Process 12 executes autonomously or substantially autonomously from any co-existing processes in runtime environment 10. Accordingly, process 12 does not adversely alter the program state of co-existing processes or the machine state of any resources allocated to co-existing processes. Similarly, co-existing processes do not adversely alter the program state of process 12 or the machine state of any resources allocated to process 12.

OS 14 manages processing and other resources of the computer system and provides a set of functions that allow process 12 and other processes in the computer system to access and use the components. In addition, OS 14 offers execution contexts to scheduler 22 and process 12 and allocates memory from a memory system, such as a memory system 104 shown in FIG. 6 and described in additional detail below, to scheduler 22 and process 12. OS 14 may allocate memory from the memory system in any suitable fixed or variable sizes (e.g., pages of 4 kilobytes (KB) to 64 KB).

Hardware threads 16 reside in execution cores of a set or one or more processor packages (e.g., processor packages 102 shown in FIG. 6 and described in additional detail below) of the computer system. Each hardware thread 16 is configured to execute instructions independently or substantially independently from the other execution cores and includes a machine state. Hardware threads 16 may be included in a single processor package or may be distributed across multiple processor packages. Each execution core in a processor package may include one or more hardware threads 16.

Resource manager 18 allocates processing resources to process 12 by assigning one or more hardware threads 16 to process 12. Resource manager 18 exists separately from OS 14 in the embodiment of FIG. 1. In other embodiments, resource manager 18 or some or all of the functions thereof may be included in OS 14.

Process 12 implicitly or explicitly causes scheduler 22 to be created via the scheduler function provided by runtime environment 10. Scheduler instance 22 may be implicitly created when process 12 uses APIs available in the computer system or programming language features. In response to the API or programming language features, runtime environment 10 creates scheduler 22 with a default policy. To explicitly create a scheduler 22, process 12 may invoke the scheduler function provided by runtime environment 10 and specifies a policy for scheduler 22. As described with reference to FIGS. 3, 4A, and 4B below, process 12 may include any number of schedulers 22 and the schedulers 22 may be arranged in one or more scheduler bundles as shown in FIGS. 4A-4B.

Scheduler 22 interacts with OS 14 and resource manager 18 to negotiate processing and other resources of the computer system in a manner that is transparent to process 12. OS 14 allocates memory to scheduler 22 in response to requests from virtual processors 32. Resource manager 18 allocates hardware threads 16 to scheduler 22 based on supply and demand and any policies of scheduler 22.

In the embodiment shown in FIG. 1, scheduler 22 manages the processing resources by creating virtual processors 32 that form an abstraction of underlying hardware threads 16. Scheduler 22 multiplexes virtual processors 32 onto hardware threads 16 by mapping each virtual processor 32 to a hardware thread 16. Scheduler 22 may map more than one virtual processor 32 onto a particular hardware thread 16 but maps only one hardware thread 16 to each virtual processor 32. In other embodiments, scheduler 22 manages processing resources in other suitable ways to cause instructions of process 12 to be executed by hardware threads 16.

Prior to executing tasks, scheduler 22 obtains execution contexts 34 and 38 from runtime environment 10 or OS 14. Available virtual processors 32 locate and execute execution contexts 34 and 38 to begin executing tasks. The set of execution contexts in scheduler 22 includes a set of execution contexts 34(1)-34(N) with respective, associated tasks 36(1)-36(N) that are being executed by respective virtual processors 32(1)-32(N), a set of zero or more runnable execution contexts 38, and a set of zero or more blocked (i.e., wait-dependent) execution contexts 40. Each execution context 34, 38 and 40 includes state information that indicates whether an execution context 34, 38 and 40 is executing, runnable (e.g., in response to becoming unblocked or added to scheduler 22), or blocked. Execution contexts 34 that are executing have been attached to a virtual processor 32 and are currently executing. Execution contexts 38 that are runnable include an associated task 39 and are ready to be executed by an available virtual processor 32. Execution contexts 40 that are blocked include an associated task 41 and are waiting for data, a message, or an event that is being generated or will be generated by another execution context 34, 38, or 40.

Each execution context 34 executing on a virtual processor 32 may generate, in the course of its execution, additional tasks 42, which are organized in any suitable way (e.g., added to work queues (not shown in FIG. 1)). Work may be created by using either application programming interfaces (APIs) provided by runtime environment 10 or programming language features and corresponding tools in one embodiment.

When processing resources are available to scheduler 22, tasks are assigned to execution contexts 34 or 38 that execute them to completion or a blocking point (e.g. waiting for a message or a stolen child task to complete) on virtual processors 32 before picking up new tasks. An execution context 34 executing on a virtual processor 32 may also unblock other execution contexts 40 by generating data, a message, or an event that will be used by another execution context 40.

Figure 5:
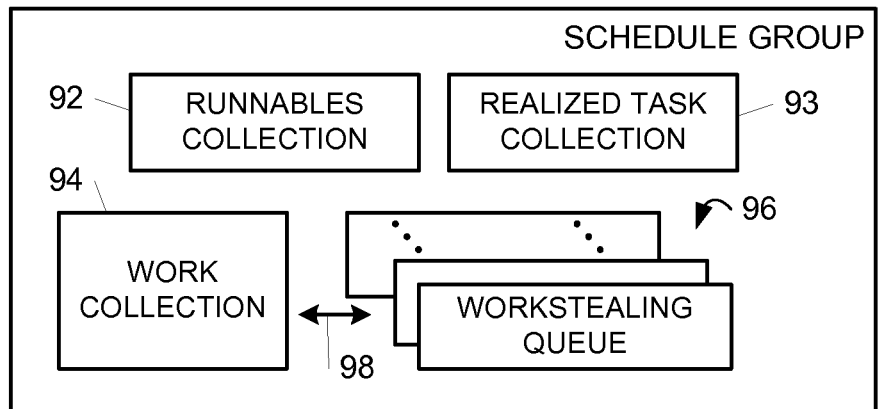
FIG. 5 is a block diagram illustrating an embodiment of a schedule group for use in a scheduler.

Each task in scheduler 22 may be realized (e.g., realized tasks 36 and 39), which indicates that an execution context 34 or 38 has been or will be attached to the task and the task is ready to execute. Realized tasks typically include light weight tasks and agents and may be associated with an execution context 34 or 38 just before executing or in advance of execution. A task that is not realized is termed unrealized. Unrealized tasks (e.g., tasks 42) may be created as child tasks generated by the execution of parent tasks and may be generated by parallel constructs (e.g., parallel, parallel for, begin, and finish). Scheduler 22 may be organized into a synchronized collection (e.g., a stack and/or a queue) for logically independent tasks with execution contexts (i.e., realized tasks) along with a list of workstealing queues for dependent tasks (i.e., unrealized tasks) as illustrated in the embodiment of FIG. 5 described below.

Upon completion, blocking, or other interruption (e.g., explicit yielding or forced preemption) of a task 36 associated with an execution context 34 running on a virtual processor 32, the virtual processor 32 becomes available to execute another realized task 39 or unrealized task 42. Scheduler 22 searches for a runnable execution context 38, a realized task 39, or an unrealized task 42 to attach to the available virtual processor 32 for execution in any suitable way. For example, scheduler 22 may first search for a runnable execution context 38 to execute before searching for a realized task 39 or an unrealized task 42 to execute. Scheduler 22 continues attaching execution contexts 38 to available virtual processors 32 for execution until all execution contexts 38 of scheduler 22 have been executed. In other embodiments, runnable execution contexts 38 and realized tasks 39 may be merged into single concept from the perspective of schedulers 22.

Scheduler 22 includes one or more memory allocators (not shown) that cause memory to be allocated for internal data structures of scheduler 22 (not shown) and tasks 36 of execution contexts 34 executing on virtual processors 34. The memory allocators request and receive access to pages of memory from OS 14 and allocate objects or other suitable portions of memory from the pages to tasks 36 executing on virtual processors 32. OS 14 may provide pages in predefined sizes of memory such as page sizes of 4 kilobytes (KB) to 64 KB to the memory allocators.

The memory allocated may include thread or context local storage (TLS or CLS) (not shown). With thread and context local storage, the allocated memory corresponds to an execution context 34 that is currently being executed by a virtual processor 32. This memory is saved along with the program state and machine state information of an execution context 34 when the execution context 34 blocks or is otherwise interrupted so that the memory can be restored when the corresponding thread or context resumes. The thread or context local storage may be moved to a new virtual processor 32 along with the execution context 34 when the execution context 34 is picked up by the new virtual processor 32 for execution. As a result, thread and context local storage is only available to tasks 36 that are executed on an execution context 34 that corresponds to the thread or context local storage. Thread and context local storage does not persist across execution contexts, and the contents of thread and context local storage are not maintained across execution contexts.

The memory allocated also includes virtual processor local storage for each virtual processor 32. Each virtual processor local storage persists across all execution contexts 34 that execute on a corresponding virtual processor 32. Accordingly, the contents of virtual processor local storages are maintained when execution contexts 34 complete, block, or are otherwise interrupted on virtual processors 32. Such contents are not saved with the program state and machine state information of an execution context 34 when the execution context 34 blocks or is otherwise interrupted. Subsequent execution contexts 34 executed by available virtual processors 32 may access, modify, and/or overwrite the data in corresponding virtual processor local storages.

Because each virtual processor 32 may execute only one execution context 34 at any given time, the execution context 34 executing on a given virtual processor 32 may access the virtual processor local storage corresponding to the virtual processor 32 without synchronization. As a result, each virtual processor 32 allows different tasks 36 that execute on different execution contexts 34 to access the same data in the virtual processor local storage corresponding to the virtual processor 32 at different times without synchronization (i.e., without using locks or other synchronization techniques on the data). An execution context 34 on one virtual processor 32 may also access the virtual processor local storage of another virtual processor 32 without synchronization for unsynchronized read accesses or without synchronization if the virtual processor local storage is structured to inherently prevent conflicting accesses.

The virtual processor local storage allocated for each virtual processor 32 in process 12 includes a current arrived counter 44 and a current completed counter 46. Current arrived counter 44 stores a count of the number of tasks that have arrived in scheduler 22 via the corresponding virtual processor 32, and current completed counter 46 stores a count of the number of tasks that been completed by the corresponding virtual processor 32. Each time that a task 36, 39, or 42 arrives at a virtual processor 32, the virtual processor 32 increments the corresponding current arrived counter 44. Each time that a task 36 completes on a virtual processor 32, the virtual processor 32 increments the corresponding current completed counter 46.

Current arrived counters 44 and current completed counters 46 are each configured to store an unsigned integer and wrap around to zero after reaching a maximum value (i.e., current arrived counters 44 and current completed counters 46 each implement modulo 2 behavior). In one embodiment, current arrived counters 44 and current completed counters 46 each include 64 bits. In other embodiments, current arrived counters 44 and current completed counters 46 each include other suitable numbers of bits that may minimize the number of time that the counters wrap around during the execution of process 12.

Each current arrived counter 44 and each current completed counter 46 may be written (i.e., incremented) only by the corresponding virtual processor 32. For example, only virtual processor 32(1) may increment current arrived counter 44(1) and current completed counter 46(1). Because each virtual processor 32 may only execute one execution context 34 and task 36 at a time, races to write the current arrived counter 44 and the current completed counter 46 of a virtual processor 32 do not occur. Accordingly, each current arrived counter 44 and each current completed counter 46 may be accessed by the corresponding virtual processor 32 without synchronization and while ensuring thread safety.

The virtual processor local storage allocated for each virtual processor 32 in process 12 also includes a previous arrived counter 45 and a previous completed counter 47. Previous arrived counters 45 store the previous counts of the corresponding current arrived counters 44 read by scheduler 22 in gathering statistics, and previous completed counters 47 stores the previous counts of the corresponding current completed counter 46 read by scheduler 22 in gathering statistics. Previous arrived counters 45 and previous completed counters 47 may be the same size as the corresponding current arrived counters 44 and current completed counters 46, respectively (e.g, 64 bits). Scheduler 22 reads the values of previous arrived counter 45 and previous completed counter 47 and uses the values in calculating statistics as described below.

Figure 2:
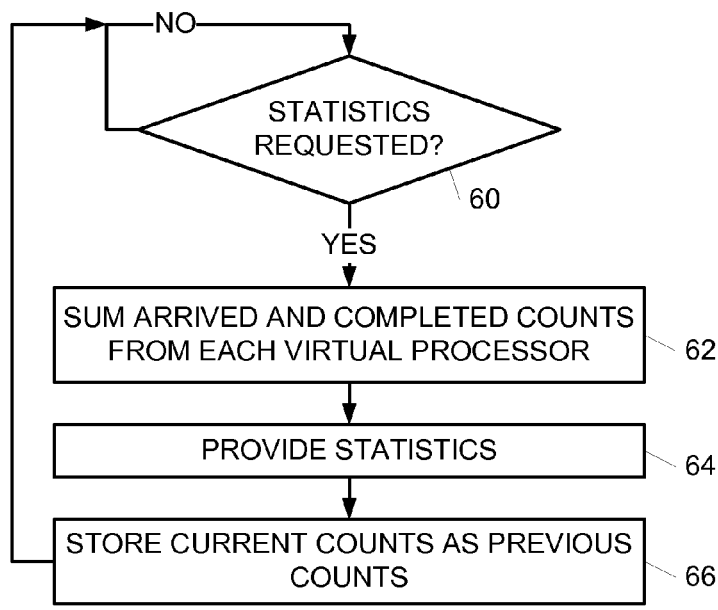
FIG. 2 is a flow chart illustrating an embodiment of a method for providing statistics of a scheduler.

FIG. 2 is a flow chart illustrating an embodiment of a method for providing statistics of a scheduler 22. The method of FIG. 2 may be performed by scheduler 22 in response to a request for statistics from resource manager 18 in one embodiment.

Referring to FIGS. 1 and 2, any time that a scheduler 22 receives a request for statistics as indicated in a block 60, scheduler 22 sums the current arrived counts 42 and current completed counts 44 from each virtual processor 32 in the scheduler 22 as indicated in a block 62. In response to requests for statistics from resource manager 18, scheduler 22 reads the values of the current arrived counters 44 and the current completed counters 46 for all virtual processors 32(1)-32(N) in scheduler 22. Scheduler 22 sums the current arrived counters 44(1)-44(N) in current tasks arrived 50 as shown in Equation I and sums the current completed counters 46(1)-46(N) in current tasks completed 52 as shown in Equation II.

$$CurrentTasksArrived = \sum_{i=1}^{N} CurrentArrivedCount_i \quad \text{Equation I}$$

$$CurrentTasksCompleted = \sum_{i=1}^{N} CurrentCompletedCount_i \quad \text{Equation II}$$

Rather than resetting current arrived counters 44 and current completed counters 46 after the reads, scheduler 22 leaves current arrived counters 44 and current completed counters 46 unchanged. By doing so, scheduler 22 may safely collect the data in current arrived counters 44 and current completed counters 46 without causing a synchronization point or a race condition.

Scheduler 22 may also reads the values of the previous arrived counters 45 and the previous completed counters 47 for all virtual processors 32(1)-32(N) in scheduler 22. Scheduler 22 sums the previous arrived counters 45(1)-45(N) in previous tasks arrived 54 as shown in Equation III and sums the previous completed counters 47(1)-47(N) in previous tasks completed 56 as shown in Equation IV.

$$PreviousTasksArrived = \sum_{i=1}^{N} PreviousArrivedCount_i \quad \text{Equation III}$$

$$PreviousTasksCompleted = \sum_{i=1}^{N} PreviousCompletedCount_i \quad \text{Equation IV}$$

After summing the current arrived counters 44, the current completed counters 46, the previous arrived counters 45, the previous completed counters 47, scheduler 22 calculates any desired statistical information from the current tasks arrived count 50, the current tasks completed count 52, a previous tasks arrived count 54, and a previous tasks completed count 56. The statistics calculated by scheduler 22 may include an arrival rate of tasks calculated as shown in Equation V using current tasks arrived 50 and previous tasks arrived 54 and a completion rate of tasks calculated as shown in Equation VI using current tasks completed 52 and previous tasks completed 56. The arrival rate indicates an approximate number of tasks 36, 39, 41, and 42 that have arrived in scheduler 22 since the last time scheduler 22 gathered statistics, and the completion rate indicates an approximate number of tasks 36, 39, 41, and 42 that have been completed in scheduler 22 since the last time scheduler 22 gathered statistics.

$$ArrivalRate = \frac{CurrentTasksArrived - previousTasksArrived}{\Delta t} \quad \text{Equation V}$$

$$CompletionRate = \frac{CurrentTasksCompleted - previousTasksCompleted}{\Delta t} \quad \text{Equation VI}$$

The statistics calculated by scheduler 22 may also include a length of queue of scheduler 22 calculated as shown in Equations VII and VIII using current arrived counters 44 and current completed counters 46 (Equation VII) or current tasks arrived 50 and current tasks completed 52 (Equation VIII). The length of queue of scheduler 22 indicates an approximate total number of tasks 36, 39, 41, and 42 in scheduler 22 at the time scheduler 22 reads the current arrived counters 44 and the current completed counters 46.

$$LengthofQueue = \sum_{i=1}^{N} \left( CurrentArrivedCount_i - CurrentCompletedCount_i \right) \quad \text{Equation VII}$$

$$LengthofQueue = CurrentTasksArrived - CurrentTasksCompleted \quad \text{Equation VIII}$$

The statistics calculated by scheduler 22 may further include a rate of queue change as shown in Equation IX using the current length of the queue (Equation VIII) and a previous length of queue calculated by substituting previous tasks arrived 54 and previous tasks completed 56 for current tasks arrived 50 and current tasks completed 52, respectively, in Equation VIII. The rate of queue change indicates a positive or negative approximate rate of change in the size of the queue (i.e., the number of tasks 36, 39, 41, and 42) in scheduler 22 since the last time scheduler 22 gathered statistics.

$$RateofQueueChange = \frac{CurrentLengthofQueue - previousLengthofQueue}{\Delta t} \quad \text{Equation IX}$$

Scheduler 22 provides statistics based on the summed current arrived counts 44 and current completed counts 46 as indicated in a block 64. Scheduler 22 also stores the current arrived counts 44 as the previous arrived counts 45 and the current completed counts 46 as the previous completed counts 47 as indicated in a block 56 and waits for the next request to gather statistics from resource manager 18.

Because the above embodiments do not use synchronization, the counts read by scheduler 22 at each polling point may not be exactly accurate because of inconsistent memory or processor buffers in the computer system. Any inaccuracies, however, may even out after several polls by resource manager 18, and any possible spikes and/or inaccurate results (i.e., statistical anomalies) may be discarded by resource manager 18.

In addition, because counters 44, 46, 50, 52, 54, and 56 have maximum values, an order of magnitude error in calculating the statistics may occur when one or more of counters 44, 46, 50, 52, 54, and 56 exceed the maximum values (i.e., wrap around). In one embodiment, the size of counters 44, 46, 50, 52, 54, and 56 may be selected to minimize the likely number of wrap arounds that may occur in the execution of process 12. In addition, resource manager 18 may configured to request statistics on a frequent basis maintain a likelihood that the statistics provided by scheduler 22 fall within an expected range. For example, the size of counters 44, 46, 50, 52, 54, and 56 may each be 64 bits and the resource manager 18 may request statistics from a scheduler 22 every 100 ms to likely eliminate the possibility that the counters 44, 46, 50, 52, 54, and 56 would exceed a maximum value between requests for statistics. In other embodiments, scheduler 22 and/or resource manager 18 may be configured to detect and compensate for wrap arounds of 44, 46, 50, 52, 54, and 56 in other suitable ways.

Figure 3:
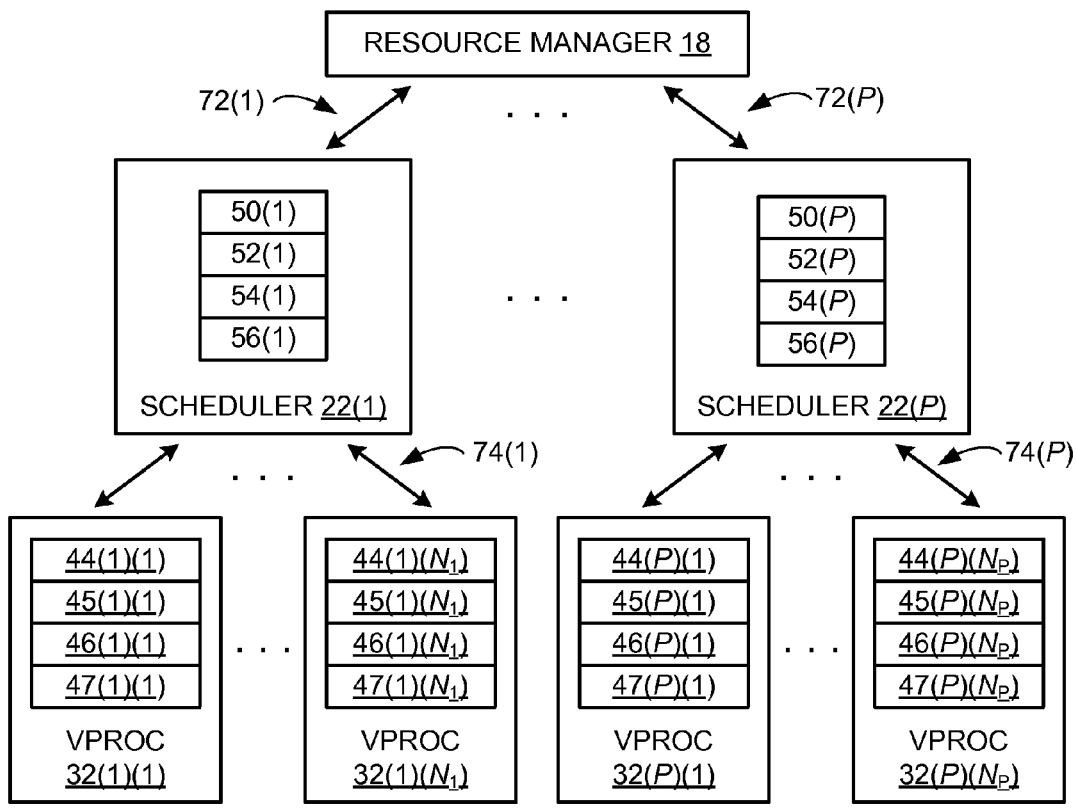
FIG. 3 is a block diagram illustrating an embodiment of a resource manager polling schedulers.
Figure 4A:
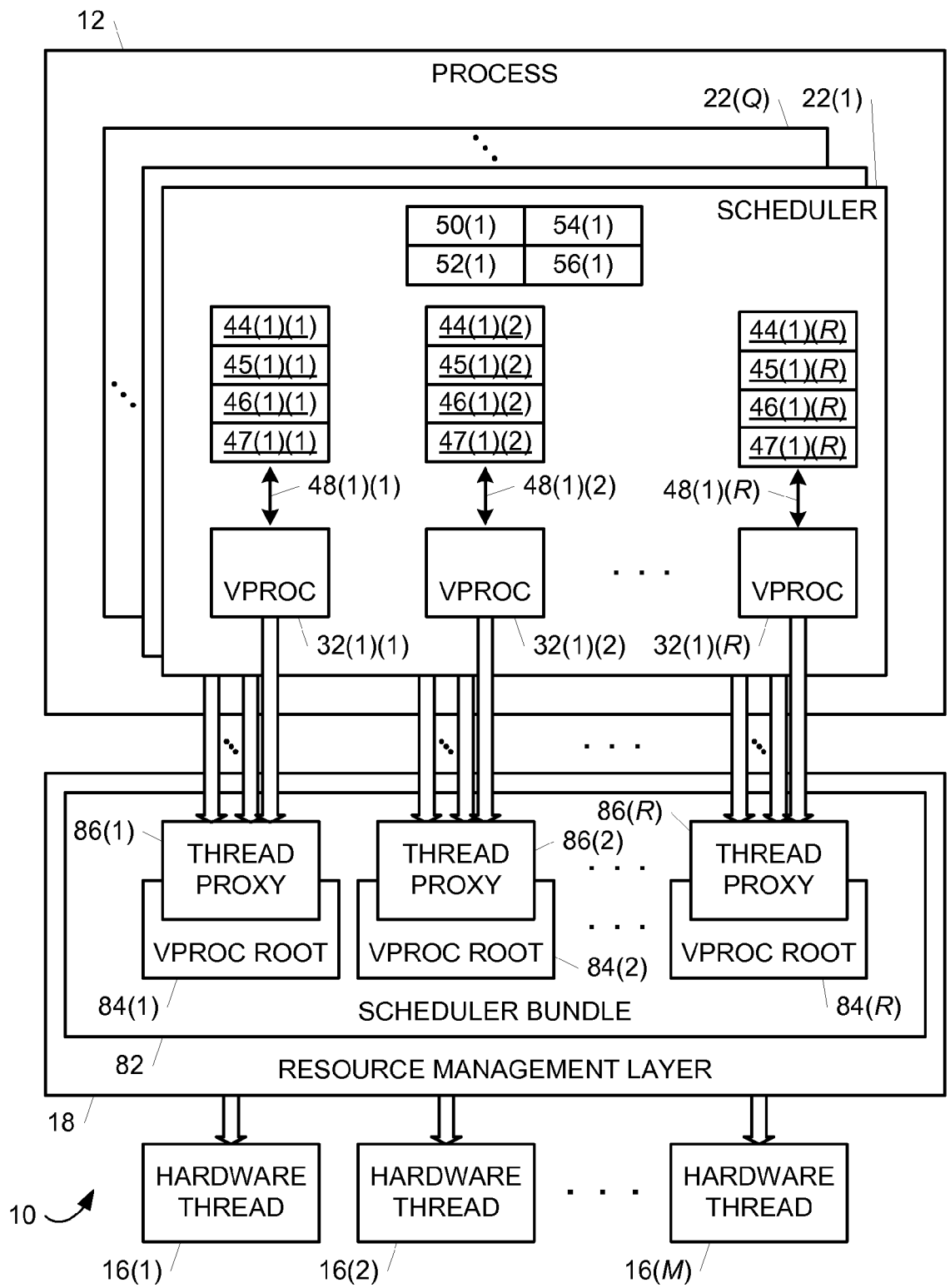
FIGS. 4A-4B are block diagrams illustrating embodiments of a scheduler bundle with virtual processor roots and thread proxies in a runtime environment.
Figure 4B:
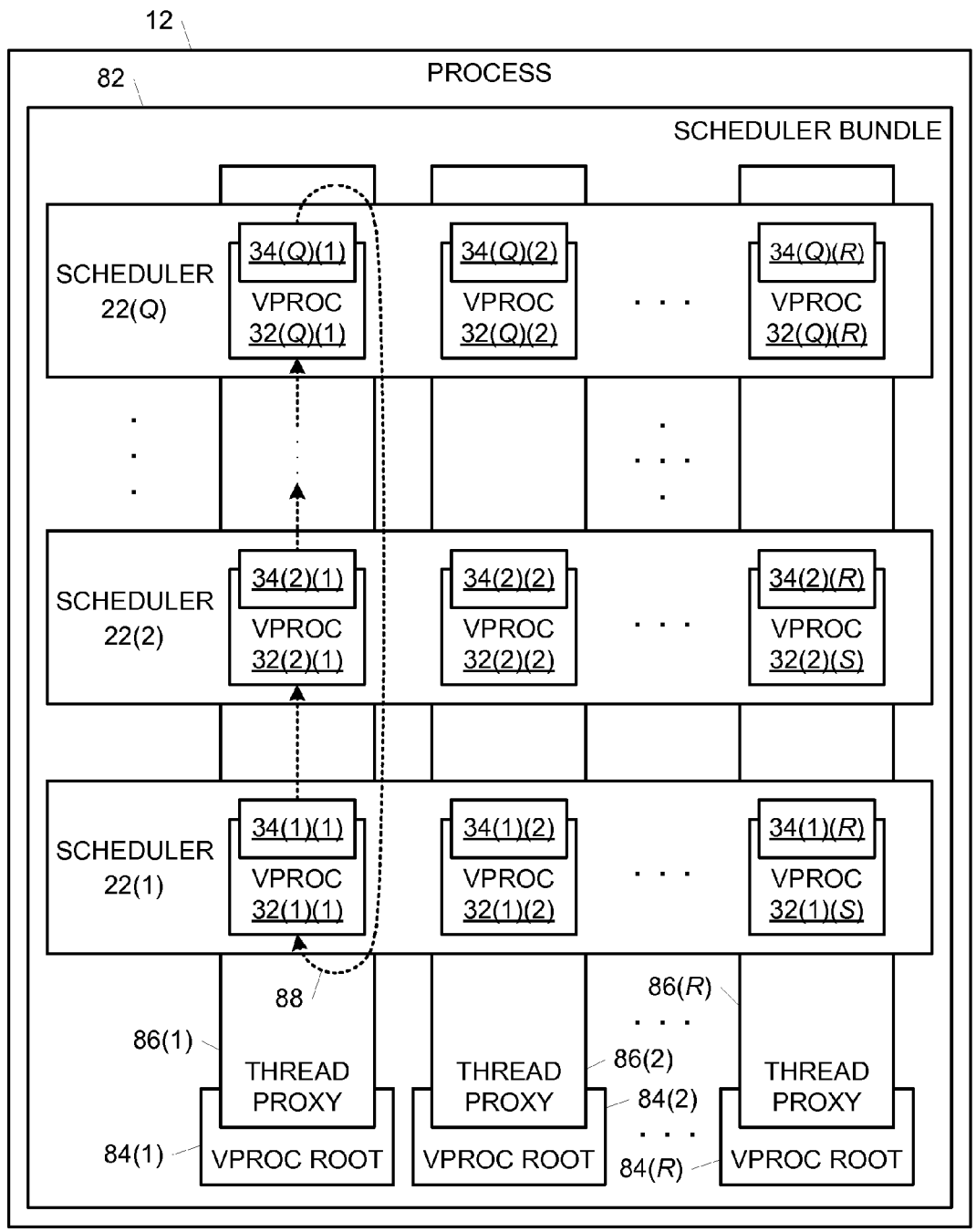

The embodiment of the method of FIG. 2 may be performed at any suitable frequency for each of a set of schedulers 22(1)-22(P) in process 12 as shown in FIG. 3 where P is an integer greater than or equal to one. FIG. 3 is a block diagram illustrating an embodiment of resource manager 18 polling schedulers 22(1)-22(P) as indicated by arrows 72(1)-72(P). Resource manager 18 may poll each scheduler 22(1)-22(P) at any suitable frequency. Schedulers 22(1)-22(P), in turn, access corresponding current arrived and current completed counts 44 and 46 and previous arrived and previous completed counts 45 and 47 as indicated by sets of arrows 74(1)-74(P) to gather the data to calculate the statistics. For example, scheduler 22(1) sums current arrived counts 44(1)(1)-44(1)($N_1$) in current arrived tasks 50(1), current completed counts 46(1)(1)-46(1)($N_1$) in current completed tasks 52(1), previous arrived counts 45(1)(1)-45(1)($N_1$) in previous arrived tasks 54(1), previous completed counts 47(1)(1)-47(1)($N_1$) in previous completed tasks 56(1), in response to a request from resource manager 18. Scheduler 22(1) then calculates statistics from current arrived tasks 50(1), current completed tasks 52(1), previous arrived tasks 54(1), and previous completed tasks 56(1) and provides the statistics to resource manager 18. Resource manager 18 may use the statistics from schedulers 22(1)-22(P) to drive dynamic feedback algorithms to determine whether to allocate more or less processing resources to schedulers 22(1)-22(P).

In the above embodiments, one or more virtual processors 32 may be removed from scheduler 22 during the operation of scheduler 22. A scheduler 22 may end an oversubscription of virtual processors 32 or resource manager 18 may reallocate one or more virtual processors 32 to another scheduler instance 22. Each time that a virtual processor 32 is removed from a scheduler 22, the counts 44-47 are added in an interlocked (i.e., synchronized) manner to an aggregate store in the scheduler 22 (not shown) and included in a subsequent gathering of statistics by scheduler 22.

Although one instance of scheduler 22 was shown in the embodiment of FIG. 1, other embodiments may include other instances of scheduler 22 where each instance includes current arrived and current completed counters 44 and 46 and previous arrived and previous completed counters 45 and 47 for each virtual processor 32 and responds to requests for statistics from resource manager 18 as described above.

In some embodiments, scheduler 22 may allow external execution contexts from process 12 to be inducted into scheduler 22 to execute tasks of the scheduler 22. In these embodiments, each external execution context stores current arrived and current completed counts and previous arrived and previous completed counts in thread local storage (not shown) similar to the way each virtual processor 32 stored the counts in virtual processor local storage as described above. For each request for statistics, scheduler 22 reads the current arrived and current completed counts and the previous arrived and previous completed counts from the thread local storage of each external count and includes these counts into the generated statistics.

External execution contexts may exit the scheduler 22 at any time. When external execution contexts exit the scheduler 22, the exiting external execution contexts store corresponding indicators with the corresponding counts in the thread local storages. Each indicator indicates that a corresponding external execution context has exited the scheduler 22. On each request for statistics, scheduler 22 detects any indicators that indicate that an external execution context has exited the scheduler 22 and deletes the counts of all external execution contexts that exited the scheduler 22 after reading the counts and including the counts in the generated statistics.

Any set or subset of schedulers 22 in process 12 may be configured into one or more scheduler bundle 82 in resource manager 18 as shown in the embodiments of FIGS. 4A-4B. Resource manager 18 may poll schedulers 22 in a scheduler bundle 82 as described above with reference to the embodiments of FIGS. 1-3 and provide the statistics or other information based on the statistics to the scheduler bundle 82. Scheduler bundles 82 may use the statistics or other information to make resource allocation decisions for the schedulers 22 in the scheduler bundle 82.

FIGS. 4A-4B are block diagrams illustrating embodiments of a scheduler bundle 82 with virtual processor roots 84(1)-84(R) and thread proxies 86(1)-86(R) in runtime environment 10 where R is an integer that is greater than or equal to one. Each thread proxy 86 provides quanta of execution of a corresponding virtual processor root 84 to execution contexts 34 on corresponding virtual processors 32 across a set of schedulers 22(1)-22(Q) of the scheduler bundle 82, where Q is an integer that is greater than or equal to one.

In the embodiment of FIGS. 4A-4B, runtime environment 10 includes a scheduler bundle function that generates scheduler bundle 82 with virtual processor roots 84 and thread proxies 86 in addition to the scheduler function that generates schedulers 22 for inclusion in scheduler bundle 82. In one embodiment, the scheduler bundle function is implemented as an application programming interface (API). In other embodiments, the scheduler bundle function may be implemented using other suitable programming constructs. When invoked, the scheduler bundle function creates scheduler bundle 82 to manage one or more schedulers 22 in scheduler bundle 82. The scheduler bundle function also creates a set of virtual processor roots 84(1)-84(R), where each virtual processor root 84 manages a corresponding set of virtual processors 32 across the schedulers 22 in scheduler bundle 82. The scheduler bundle function further creates a set of thread proxies 86(1)-86(R), where each thread proxy 86 executes a corresponding set of scheduler execution contexts across the schedulers 22 in scheduler bundle 82 on a corresponding virtual processor root 84. The scheduler function creates a scheduler 22 in scheduler bundle 82, where each scheduler 22 operates to schedule execution contexts of process 12 for execution on virtual processors 32 of the scheduler 22. The execution contexts execute on thread proxies 86 which in turn execute on execution contexts on hardware threads 16.

Resource manager 18 also includes the scheduler bundle function in one embodiment and thus, creates and manages scheduler bundle 82, virtual processor roots 84, and thread proxies 86. Resource manager 18 causes thread proxies 86 on corresponding virtual processor roots 84 to be executed on underlying execution contexts obtained from the OS on hardware threads 16.

Process 12 implicitly or explicitly causes scheduler bundle 82, virtual processor roots 84(1)-20(R), thread proxies 86(1)-21(R), and schedulers 22(1)-22(Q) to be created via the corresponding functions provided by runtime environment 10 and/or resource manager 18. Scheduler bundle 82, virtual processor roots 84, thread proxies 86, and schedulers 22 may be implicitly created when process 12 uses APIs available in the computer system or programming language features. In response to the API or programming language features, runtime environment 10 creates scheduler bundle 82, virtual processor roots 84, thread proxies 86, and schedulers 22 that inherit the policies of scheduler bundle 82. To explicitly create scheduler bundle 82, virtual processor roots 84, thread proxies 86, and schedulers 22, process 12 may invoke the scheduler bundle and scheduler functions provided by runtime environment 10 and specify one or more policies for scheduler bundle 82, virtual processor roots 84, thread proxies 86, and schedulers 22.

Scheduler bundle 82 manages virtual processor roots 84 and corresponding thread proxies 86 to share virtual processor roots 84 and thread proxies 86 among all schedulers 22(1)-22(Q) in scheduler bundle 82. Scheduler bundle 82 may share virtual processor roots 84 and thread proxies 86 among schedulers 22(1)-22(Q) cooperatively, preemptively, or with another suitable type of time slicing. As part of creating scheduler bundle 82, resource manager 18 allocates virtual processor roots 84 and thread proxies 86 to scheduler bundle 82 based on supply and demand and any policies of scheduler bundle 82. In one embodiment, scheduler bundle 82 creates each scheduler 22(1)-22(Q). In other embodiments, one or more of scheduler 22(1)-22(Q) that are external to scheduler bundle 82 may invoke a programming API or other suitable programming construct to attach to scheduler bundle 82.

In one embodiment, process 12 adds each scheduler 22(1)-22(Q) to scheduler bundle 82 with the same set of scheduler policies. In another embodiment, process 12 adds each scheduler 22(1)-22(Q) to scheduler bundle 82 with a different set of scheduler policies. Each scheduler 22 receives virtual processors 32(1)-32(R) where each virtual processor 32 forms an abstraction of underlying virtual processor roots 84 and hardware threads 16. Each scheduler 22 also receives information that maps virtual processors 32(1)-32(R) of a scheduler 22 to corresponding virtual processor roots 84(1)-20(R). As shown in FIG. 4B, virtual processors 32(1)(1)-32(Q)(1) from respective schedulers 22(1)-22(Q) map to virtual processor root 84(1), virtual processors 32(1)(2)-32(Q)(2) from respective schedulers 22(1)-22(Q) map to virtual processor root 84(2), and so on.

Scheduler bundle 82 allows virtual processor roots 84 and thread proxies 86 to be shared among execution contexts 34 of schedulers 22(1)-22(Q) cooperatively, preemptively, or with another suitable time slicing. Each virtual processor root 84 forms an abstraction of a hardware thread 16 and executes a corresponding thread proxy 86. Each thread proxy 86 forms an abstraction of an execution context and executes the execution context on a corresponding virtual processor root 84. Resource manager 18 multiplexes virtual processor roots 84 onto hardware threads 16 by mapping each virtual processor root 84 to a hardware thread 16. Resource manager 18 may map more than one virtual processor root 84 onto a particular hardware thread 16 but maps only one hardware thread 16 to each virtual processor root 84. In other embodiments, resource manager 18 manages processing resources in other suitable ways to cause thread proxies 86 to be executed by hardware threads 16.

Scheduler bundle 82 schedules the execution contexts 34 on thread proxies 86 and schedules thread proxies 86 on virtual processor roots 84 which execute on execution contexts associated with hardware threads 16. Each thread proxy 86 switches between execution of execution contexts 34 on virtual processors 32 on the corresponding virtual processor root 84. Each thread proxy 86 causes a single execution context 34 to be executed at any given time but periodically performs context switches between execution of execution contexts 34 to execute each of the set of execution contexts 34 on virtual processors 32 that correspond to the virtual processor root 84 of the thread proxy 86. Each thread proxy 86 provides a quantum of execution upon dispatching an execution context 34 of a scheduler 22. The quantum of execution may be expressed in time (e.g., 50 ms), by a number of tasks to be executed, or by any other suitable metric. The quantum of execution may be the same or different for each dispatched execution context 34.

As shown in FIG. 4B, thread proxy 86(1) switches between execution of execution contexts 34(1)(1)-34(Q)(1) from respective schedulers 22(1)-22(Q), thread proxy 86(2) switches between execution of execution contexts 34(1)(2)-34(Q)(2) from respective schedulers 22(1)-22(Q), and so on. As shown by an arrow 88, for example, thread proxy 86(1) dispatches execution context 34(1)(1) for a quantum of execution on virtual processor root 84(1) and, once execution context 34(1)(1) detects that quantum has expired and yields back to thread proxy 86(1), thread proxy 86(1) dispatches execution context 34(2)(1) for a quantum of execution on virtual processor root 84(1). Thread proxy 86(1) continues the process of dispatching a next one of the set of execution contexts 34(1)(1)-34(Q)(1) each time a current one of the set of execution context 34(1)(1)-34(Q)(1) yields back to thread proxy 86(1). Referring back to FIG. 4A, scheduler 22 executes execution contexts 34 on virtual processors 32 which are, in turn, executed by thread proxies 86 on virtual processor roots 84.

As noted above, resource manager 18 may poll schedulers 22 in scheduler bundle 82 as described above with reference to the embodiments of FIGS. 1-3 and provide the statistics or other information based on the statistics to the scheduler bundle 82. Scheduler bundle 82 may use the statistics or other information to determine whether or not a given scheduler 22 should be serviced by a thread proxy 86. Scheduler bundle 82 may avoid servicing schedulers 22 with no tasks to execute.

The above embodiments may allow data to be gathered from process 12 while minimizing the effects of the data gathering on process 12. The gathering of statistics without synchronization and with thread safety minimizes the impact on scheduling tasks for execution in each scheduler 22 while providing statistical information to resource manager 18 that allows resource manager 18 to make informed decisions regarding resource allocation.

In the above embodiments, scheduler 22 may operate as a cooperative scheduler where process 12 and other processes are associated with virtual processors 32 in a controlled way. In other embodiments, scheduler 22 may operate as another type of scheduler such as a preemptive scheduler.

In one embodiment, process 12 (shown in FIGS. 1 and 4A) organizes tasks into one or more schedule groups 90 (shown in FIG. 5) and presents schedule groups 90 to scheduler 22 as shown in FIG. 5. In other embodiments, process 12 organizes tasks into collections for each virtual processor 32 of scheduler 22 in other suitable ways.

FIG. 5 is a block diagram illustrating an embodiment of a schedule group 90 for use in a scheduler 22. Schedule group 90 includes a runnables collection 92, a realized task collection 93, a work collection 94, and a set of zero or more workstealing queues 96. Runnables collection 92 contains a list of unblocked execution contexts 38. Scheduler 22 adds an execution context 38 to runnables collections 92 when an execution context becomes unblocked. Realized task collection 93 contains a list of realized tasks 39 (e.g., unstarted agents) that may or may not have associated execution contexts 38. Scheduler 22 adds a realized task to realized task collection 93 when a new, unstarted task is presented to scheduler 22 by process 12. Work collection 94 contains a list of workstealing queues 96 as indicated by an arrow 98 and tracks the execution contexts 34 that are executing tasks from the workstealing queues 96. Each workstealing queue 96 includes one or more unrealized tasks 42 with no assigned execution context 34 or 38.

Using the embodiment of FIG. 5, scheduler 22 may first search for unblocked execution contexts 38 in the runnables collection 92 of each schedule group 90 in scheduler 22. Scheduler 22 may then search for realized tasks in the realized task collection 93 of all schedule groups 90 before searching for unrealized tasks in the workstealing queues 96 of the schedule groups 90.

In one embodiment, a virtual processor 32 that becomes available may attempt to locate a runnable execution context 38 in the runnables collection 92 or a realized task 39 in the realized task collection 93 in the schedule group 90 from which the available virtual processor 32 most recently obtained a runnable execution context 38 (i.e., the current schedule group 90). The available virtual processor 32 may then attempt to locate a runnable execution context 38 in the runnables collections 92 or a realized task 39 in the realized task collection 93 in the remaining schedule groups 90 of scheduler 22 in a round-robin or other suitable order. If no runnable execution context 38 is found, then the available virtual processor 32 may then attempt to locate an unrealized task 42 in the workstealing queues 96 of the current schedule group 90 before searching the workstealing queues 96 in the remaining schedule groups 90 in a round-robin or other suitable order.

In other embodiments, schedule groups 90 contain other suitable numbers, types, and/or configurations of task collections.

Figure 6:
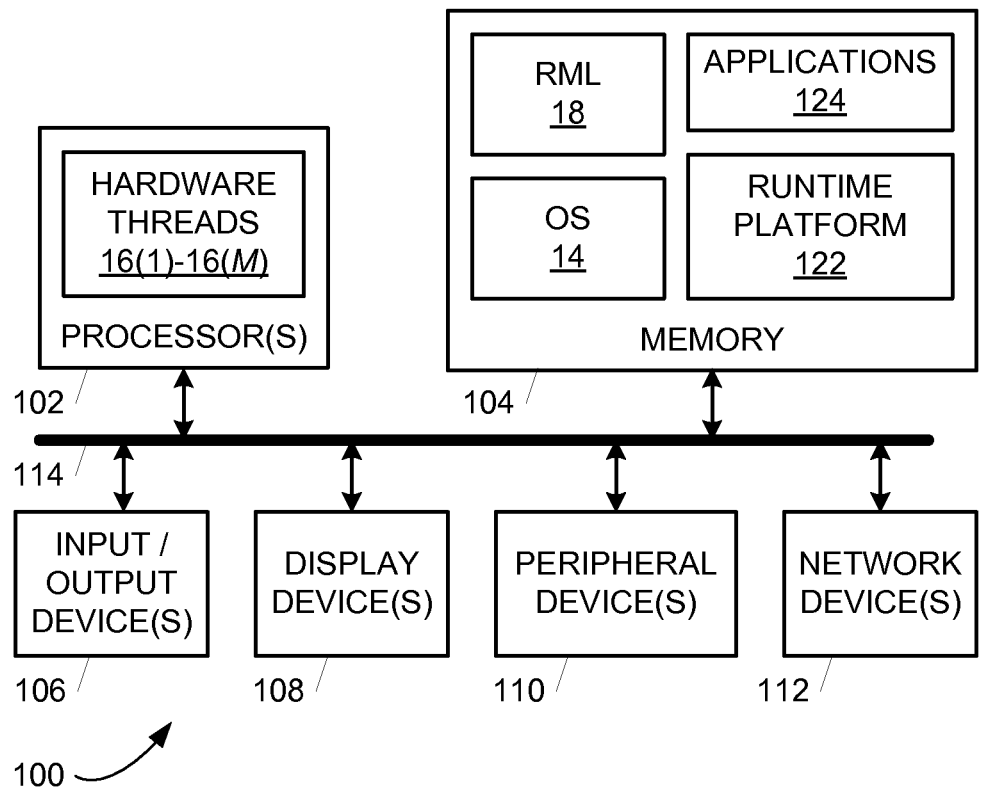
FIG. 6 is a block diagram illustrating an embodiment of a computer system configured to implement a runtime environment that includes a scheduler in a process.

FIG. 6 is a block diagram illustrating an embodiment of computer system 100 which is configured to implement runtime environment 10 including scheduler 22 in process 12 where scheduler 22 is configured to schedule execution contexts for execution by processing resources as described above.

Computer system 100 includes one or more processor packages 102, memory system 104 (also shown in FIG. 1), zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 include hardware threads 16(1)-16(M). Each processor package 102 may include hardware threads 16 with the same or different architectures and/or instruction sets. For example, hardware threads 16 may include any combination of in-order execution cores, superscalar execution cores, and GPGPU execution cores. Each hardware thread 16 in processor packages 102 is configured to access and execute instructions stored in memory system 104. The instructions may include a basic input output system (BIOS) or firmware (not shown), OS 14 (also shown in FIG. 1), a runtime platform 122, applications 124, and resource manager 18 (also shown in FIG. 1). Each hardware thread 16 may execute the instructions in conjunction with or in response to information received from input/output devices 106, display devices 108, peripheral devices 110, and/or network devices 112.

Memory system 104 includes any suitable type, number, and configuration of volatile or non-volatile storage devices configured to store instructions and data. The storage devices of memory system 104 represent computer readable storage media that store computer-executable instructions including OS 14, resource manager 18, runtime platform 122, and applications 124. Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112. The instructions are executable by computer system 100 to perform the functions and methods of OS 14, resource manager 18, runtime platform 122, and applications 124 described herein. Examples of storage devices in memory system 104 include hard disk drives, random access memory (RAM), read only memory (ROM), flash memory drives and cards, and magnetic and optical disks.

Computer system 100 boots and executes OS 14. OS 14 includes instructions executable by hardware threads 16 to manage the components of computer system 100 and provide a set of functions that allow applications 124 to access and use the components. In one embodiment, OS 14 is the Windows operating system. In other embodiments, OS 14 is another operating system suitable for use with computer system 100.

Resource manager 18 includes instructions that are executable in conjunction with OS 14 to allocate resources of computer system 100 including hardware threads 16 as described above with reference to FIG. 1. Resource manager 18 may be included in computer system 100 as a library of functions available to one or more applications 124 or as an integrated part of OS 14, for example.

Runtime platform 122 includes instructions that are executable in conjunction with OS 14 and resource manager 18 to generate runtime environment 10 and provide runtime functions to applications 124. These runtime functions include a scheduler function as described in additional detail above with reference to FIG. 1. The runtime functions may be included in computer system 100 as part of an application 124, as a library of functions available to one or more applications 124, or as an integrated part of OS 14 and/or resource manager 18.

Each application 124 includes instructions that are executable in conjunction with OS 14, resource manager 18, and/or runtime platform 122 to cause desired operations to be performed by computer system 100. Each application 124 represents one or more processes, such as process 12 as described above, that may execute with one or more schedulers 22 as provided by runtime platform 122.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A volatile or non-volatile storage device storing computer-executable instructions that, when executed in a scheduler of a process of a computer system, perform a method comprising:

selectively mapping, by the scheduler, hardware threads to virtual processors of the scheduler, the scheduler being limited to mapping a single hardware thread of the hardware threads to a virtual processor of the virtual processors;

processing two or more tasks using two or more of the virtual processors, each of the two or more of the virtual processors processing a single task at a time;

processing an additional task subsequent to processing one of the two or more tasks using one of the virtual processors;

updating by each virtual processor of the two or more of the virtual processors a first number of current arrived tasks and a second number of current completed tasks in a respective storage accessible by each of the two or more of the virtual processors without performing a data locking synchronization and by the one of the virtual processors, subsequent to the updating by each virtual processor, the first number of current arrived tasks and the second number of current completed tasks in the storage of the one of the virtual processors without performing a data locking synchronization;

accessing the storage to read at least one of the first number and the second number of one of the each of the two or more of the virtual processors without performing a data locking synchronization;

summing each of the first numbers into a current tasks arrived count and each of the second numbers into a current tasks completed count; and providing statistics determined from the current tasks arrived count and the current tasks completed count.

2. The volatile or non-volatile storage device of claim 1, the method further comprising:

accessing each of the first numbers and each of the second numbers without performing a data locking synchronization.

3. The volatile or non-volatile storage device of claim 1, the method further comprising:

incrementing each of the first numbers and each of the second numbers without performing a data locking synchronization.

4. The volatile or non-volatile storage device of claim 1, the method further comprising:

providing the statistics in response to a request from a resource manager.

5. The volatile or non-volatile storage device of claim 1, the method further comprising:

storing the first number of arrived tasks and the second number of completed tasks in a corresponding local storage for each virtual processor that is accessible by a plurality of virtual processors.

6. The volatile or non-volatile storage device of claim 1, the method further comprising:

determining the statistics from the current tasks arrived count, the current tasks completed count, a previous tasks arrived count, and previous tasks completed count.

7. The volatile or non-volatile storage device of claim 6, the method further comprising:

storing the first numbers of current arrived tasks as corresponding third numbers of previous arrived tasks with each of the virtual processors of the scheduler;

storing the second numbers of current completed tasks as corresponding fourth numbers of previous completed tasks with each of the virtual processors of the scheduler; and summing each of the third numbers into the previous tasks arrived count and each of the fourth numbers into the previous tasks completed count.

8. The volatile or non-volatile storage device of claim 1, wherein the statistics identify a third number of tasks in a queue of the scheduler.

9. The volatile or non-volatile storage device of claim 1, wherein updating comprises:

updating by a first execution context that executes on the first virtual processor and by a second execution context that executes on the first virtual processor subsequent to the first execution context to increment the respective first number of current arrived tasks and second number of current completed tasks corresponding to the first virtual processor without performing a data locking synchronization.

10. A method performed by a scheduler in a process executing on a computer system, the method comprising:

allowing a first execution context that executes on a first virtual processor of the scheduler that executes one execution context at a time to increment a first current arrived counter and a first current completed counter corresponding to the first virtual processor without performing a data locking synchronization;

allowing a second execution context that executes on a second virtual processor of the scheduler that executes one execution context at a time to increment a second current arrived counter and a second current completed counter corresponding to the second virtual processor without performing a data locking synchronization;

selectively mapping, by a scheduler, hardware threads to the first virtual processor and to the second virtual processor, the scheduler being limited to mapping a single hardware thread of the hardware threads to the first and second virtual processors;

allowing a third execution context that executes on the first virtual processor subsequent to the first execution context to increment the first current arrived counter and the first current completed counter corresponding to the first virtual processor without performing a data locking synchronization; and gathering statistical information regarding the execution of tasks in the scheduler from the first and the second current arrived counters and the first and the second current completed counters within the scheduler without performing a data locking synchronization;

the first current arrived counter, the first current completed counter, the second current arrived counter, and the second current completed counter being incremented in a respective storage accessible by the first virtual processor and the second virtual processor without performing a data locking synchronization.

11. The method of claim 10 further comprising:
gathering the statistical information without resetting the first or the second current arrived counter or the first or the second current completed counter.

12. The method of claim 10 further comprising: summing the first and the second current arrived counters into a current tasks arrived count;
summing the first and the second current completed counters into a current tasks completed count; and generating the statistical information from the current tasks arrived count and the current tasks completed count.

13. The method of claim 12 further comprising:
summing first and second previous arrived counters from the first and the second virtual processors, respectively, into a previous tasks arrived count;
summing first and second previous completed counters from the first and the second virtual processors, respectively, into a previous tasks completed count; and
generating the statistical information from the current tasks arrived count, the current tasks completed count, the previous tasks arrived count, and the previous tasks completed count.

14. The method of claim 13 further comprising:
subtracting the current tasks completed count from the current tasks arrived count to calculate a number of tasks in the scheduler;
subtracting the previous tasks arrived count from the current tasks arrived count to calculate a first rate of tasks arriving in the scheduler; and
subtracting the previous tasks completed count from the current tasks completed count to calculate a second rate of tasks completing in the scheduler.

15. A volatile or non-volatile storage device storing computer-executable instructions that, when executed in a scheduler of a process of a computer system, perform a method comprising:
selectively mapping, by the scheduler, hardware threads to virtual processors of the scheduler, the scheduler being limited to mapping a single hardware thread of the hardware threads to a virtual processor of the virtual processors;
receiving a request for statistical information from a resource manager;
accessing a first number of current arrived tasks, a second number of current completed tasks, a third number of previous arrived tasks, and a fourth number of previous completed tasks from a storage that is accessible by a first virtual processor of the scheduler and a second virtual processor of the scheduler without performing a data locking synchronization of the first number, the second number, the third number, and/or the fourth number, the first number and the second number being configured to be updated by the first virtual processor, and the third number and the fourth number being configured to be updated by the second virtual processor;
summing the first number of current arrived tasks into a current tasks arrived count from each virtual processor of the scheduler and the second number of current completed tasks into a current tasks completed count from each virtual processor of the scheduler;
summing the third number of previous arrived tasks into a previous tasks arrived count from each virtual processor of the scheduler and the fourth number of previous completed tasks into a previous tasks completed count from each virtual processor of the scheduler; and
providing the statistical information determined from the current tasks arrived count, the current tasks completed count, the previous tasks arrived count, and the previous tasks completed count to the resource manager;
the first and the second virtual processors of the scheduler each updating a respective first number of current arrived tasks, a respective second number of current completed tasks, a respective third number of previous arrived tasks, and a respective fourth number of previous completed tasks in the storage.

16. The volatile or non-volatile storage device of claim 15, the method further comprising:
incrementing each of the first numbers and each of the second numbers without performing a data locking synchronization.

17. The volatile or non-volatile storage device of claim 15, the method further comprising:
storing the first numbers of current arrived tasks as the third numbers of previous arrived tasks with each of the virtual processors of the scheduler; and
storing the second numbers of current completed tasks as the fourth numbers of previous completed tasks with each of the virtual processors of the scheduler.

18. The volatile or non-volatile storage device of claim 15, the method further comprising:
updating at least one of the first number of current arrived tasks or the second number of current completed tasks in the storage by a first execution context that executes on the first virtual processor and a second execution context that executes on the first virtual processor subsequent to the first execution context without performing a data locking synchronization.

* * * * *